US009759992B2

(12) United States Patent
Suzuki

(10) Patent No.: US 9,759,992 B2
(45) Date of Patent: Sep. 12, 2017

(54) PROJECTION APPARATUS, PROJECTION METHOD, AND STORAGE MEDIUM STORING PROGRAM

(71) Applicant: CASIO COMPUTER CO., LTD., Tokyo (JP)

(72) Inventor: Minoru Suzuki, Tendo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 11 days.

(21) Appl. No.: 14/850,289

(22) Filed: Sep. 10, 2015

(65) Prior Publication Data

US 2016/0070160 A1    Mar. 10, 2016

(30) Foreign Application Priority Data

Sep. 10, 2014    (JP) ................................. 2014-183929

(51) Int. Cl.
    G03B 21/26    (2006.01)
    G03B 21/00    (2006.01)
    G03B 21/10    (2006.01)
    G03B 21/56    (2006.01)

(52) U.S. Cl.
    CPC ............. *G03B 21/26* (2013.01); *G03B 21/10* (2013.01); *G03B 21/56* (2013.01); *G03B 21/005* (2013.01)

(58) Field of Classification Search
    CPC ........ G03B 21/10; G03B 21/26; G03B 21/56; G03B 21/562; G03B 21/30; G03B 21/58
    USPC .......................................................... 353/79
    See application file for complete search history.

(56) References Cited

U.S. PATENT DOCUMENTS

| 2006/0087623 | A1* | 4/2006 | Schneider | H04N 9/3141 353/77 |
| 2006/0187423 | A1* | 8/2006 | Hamilton | G03B 21/10 353/79 |
| 2006/0268233 | A1* | 11/2006 | Sato | H04N 9/3141 353/13 |
| 2006/0279477 | A1* | 12/2006 | Allen | H04N 9/3194 345/30 |
| 2007/0091278 | A1* | 4/2007 | Zakoji | G03B 21/14 353/79 |
| 2015/0109665 | A1* | 4/2015 | Miggiano | G03B 21/58 359/444 |

FOREIGN PATENT DOCUMENTS

JP    2011-150221 A    8/2011

* cited by examiner

*Primary Examiner* — Christina Riddle
*Assistant Examiner* — Christopher Lamb, II
(74) *Attorney, Agent, or Firm* — Scully, Scott, Murphy & Presser, P.C.

(57) ABSTRACT

According to one embodiment, a projection apparatus including: a first screen; a projection unit configured to project an image on a projection area including the first screen; a second screen configured to be capable of being disposed at a position within the projection area of projection by the projection unit and away from the first screen; a shifting mechanism configured to shift the second screen; and a screen controller configured to shift the second screen by the shifting mechanism in accordance with an image which is projected by the projection unit.

6 Claims, 4 Drawing Sheets

PROJECTION APPARATUS, PROJECTION METHOD, AND STORAGE MEDIUM STORING PROGRAM

CROSS-REFERENCE TO RELATED APPLICATIONS

This application is based upon and claims the benefit of priority from Japanese Patent Application No. 2014-183929, filed Sep. 10, 2014, the entire contents of which are incorporated herein by reference.

BACKGROUND OF THE INVENTION

1. Field of the Invention

The present invention relates to a projection apparatus that is suited as an apparatus which is disposed, for example, on a sales floor of a store, and introduces various goods, and also relates to a projection method and a storage medium storing a program.

2. Description of the Related Art

Jpn. Pat. Appln. KOKAI Publication No. 2011-150221 discloses a video output device-equipped apparatus which is configured to project video content on a screen of a non-standard shape, such as a human shape, by rear projection, thereby to enhance an impression on a viewer.

In the technique disclosed in Jpn. Pat. Appln. KOKAI Publication No. 2011-150221, projection is intentionally performed on a screen of a nonstandard shape, such as a human shape, and not on screen of a standard shape such as a rectangular shape. Thereby, a visual appeal power to the viewer is enhanced.

In general, in many cases, in this type of projection apparatus, a display element, such as a liquid crystal panel or a micro-mirror element, which forms an optical image, has a display area of a standard shape such as a rectangular shape. On the other hand, a screen, which is a projection target, has a nonstandard shape such as the above-described human shape.

Thus, in particular, in the apparatus disclosed in Jpn. Pat. Appln. KOKAI Publication No. 2011-150221, which is configured to perform projection from the back side of the screen by a rear projection method, an image for projection is displayed on a part of the display area of the display element, and black display is effected on the other part of the display area, which does not display the image for projection, thereby shielding light from the light source. This prevents projection light in a range outside the screen from being radiated on the viewer in front of the apparatus.

In this type of projection apparatus using the screen of the nonstandard shape, in particular, in a projection apparatus in which a plurality of screens of nonstandard shapes can be selectively changed, the display area which the display element has is not fully utilized. In order to effectively utilize the display area, a screen of a shape corresponding to the projectable range, for example, a rectangular screen, may be used. However, in this case, compared to the case of using the screen of the nonstandard shape such as the human shape, the appeal power to the viewer at a time of projecting an image of commodity information, etc. is decreased.

The present invention has been made in consideration of the above circumstances, and the object of the invention is to provide a projection apparatus which can project an image with a high appeal power to a viewer, while effectively utilizing an area where an image can be projected, a projection method a storage medium storing a program.

SUMMARY OF THE INVENTION

In general, according to one embodiment, a projection apparatus comprising: a first screen; a projection unit configured to project an image on a projection area including the first screen; a second screen configured to be capable of being disposed at a position within the projection area of projection by the projection unit and away from the first screen; a shifting mechanism configured to shift the second screen; and a screen controller configured to shift the second screen by the shifting mechanism in accordance with an image which is projected by the projection unit.

DETAILED DESCRIPTION OF THE PREFERRED EMBODIMENT

Hereinafter, a best mode for carrying out the invention is described with reference to the accompanying drawings. In the embodiment to be described below, various limitations, which are technically preferable in order to implement the invention, are added. However, the scope of the invention is not limited to the embodiment and illustrative examples.

Referring now to the accompanying drawings, a description is given of an embodiment in a case in which the invention is applied to a signage apparatus which is disposed in a store or the like.

Figure 1:
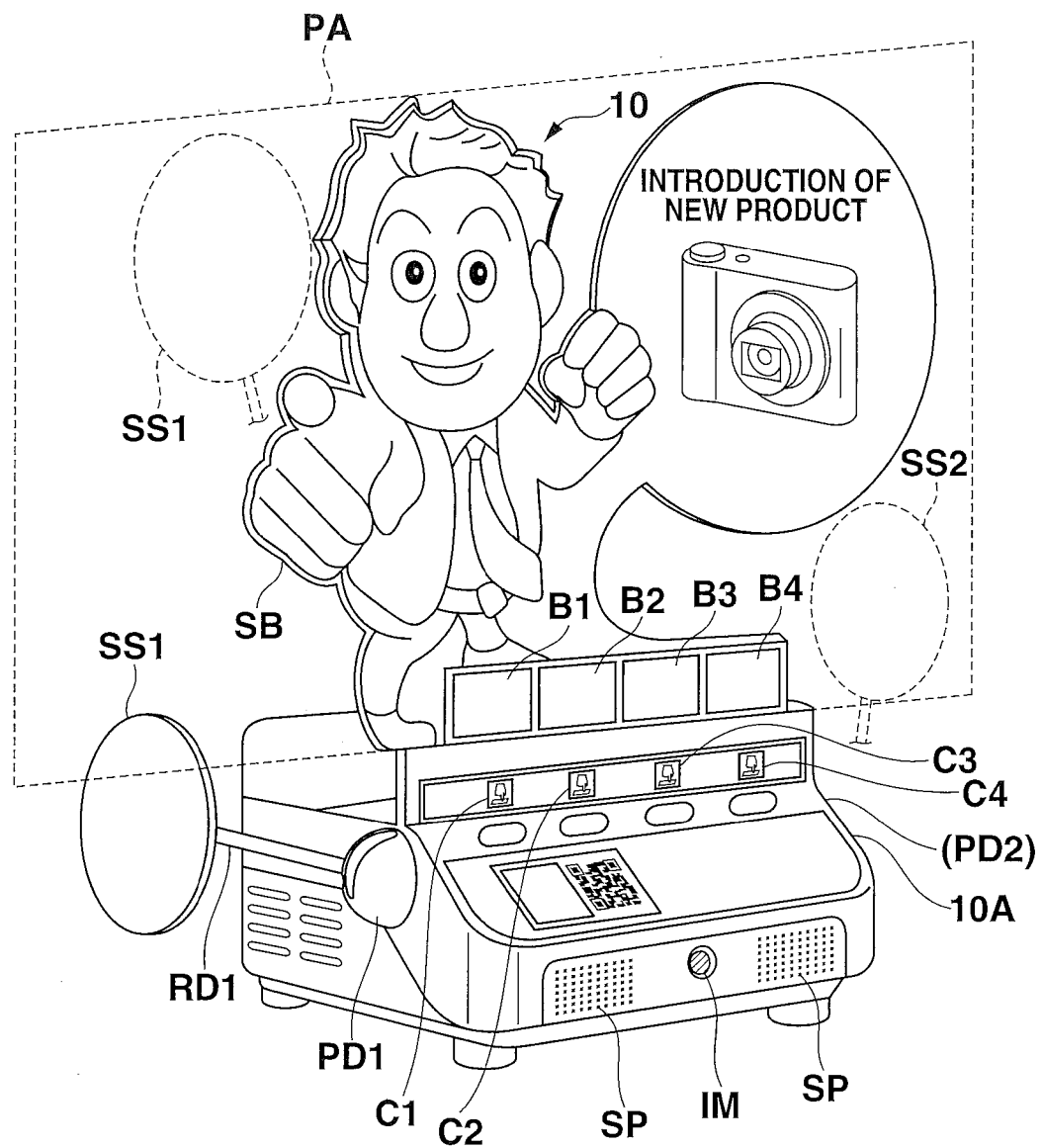
FIG. 1 is a perspective view illustrating an external-appearance configuration of a signage apparatus according to an embodiment of the present invention.

FIG. 1 is a perspective view illustrating an external-appearance configuration of the signage apparatus 10. The signage apparatus 10 is an electronic mannequin using a projector technique. A signage board SB, which serves as a main screen, is fixed to an apparatus housing 10A on a front end side of the top surface of the apparatus housing 10A. The signage board SB is changeable. This signage board SB is formed in an arbitrary shape, and is permanently provided such that the signage board SB is included within a rectangular projectable area PA indicated by a broken line in FIG. 1. The signage board SB has a semitransparent plate-like configuration.

An optical image that is emitted from a projection lens (not shown) of a rear projection method, which is provided on the top surface of the apparatus housing 10A, is projected from the rear side of the signage board SB. Thereby, the signage board SB displays, for example, an image as illustrated in FIG. 1.

A plurality of, or four in this embodiment, button display units B1 to B4 are projected on a lower part of the signage board SB. Operation buttons C1 to C4 corresponding to the button display units B1 to B4 are disposed on a signage board SB attachment portion under the button display units B1 to B4. In accordance with the display content of the button display units B1 to B4, any one of the operation buttons C1 to C4 is touch-operated by the viewer. A line-shaped infrared sensor array is disposed immediately under the operation buttons C1 to C4. The infrared sensors of the infrared sensor array have directivities, respectively, and can detect operation positions on the operation buttons C1 to C4.

In addition, on a lower part of the front surface of the apparatus housing 10A, there are provided an imaging unit IM for photographing a person who operates the operation buttons C1 to C4 of the signage apparatus 10, and speaker units SP.

Sub-screens SS1 and SS2 and their driving mechanisms PD1 and PD2 are provided on both side surfaces of the apparatus housing 10A, although FIG. 1 shows only the right side surface. The driving mechanisms PD1 and PD2 selectively dispose, where necessary, the sub-screens SS1 and SS2 in the projectable area PA. An image, which is associated with an image projected on the signage board SB, is projected on the sub-screen SS1, SS2. The driving mechanisms PD1 and PD2 are coupled to the sub-screens SS1 and SS2 via rods RD1 and RD2. By a servo motor and a gear mechanism, the driving mechanism PD1, PD2 rotates the attachment angle of the rod RD1, RD2 over about 90° in each of two steps in the horizontal direction and vertical direction.

Figure 2A:
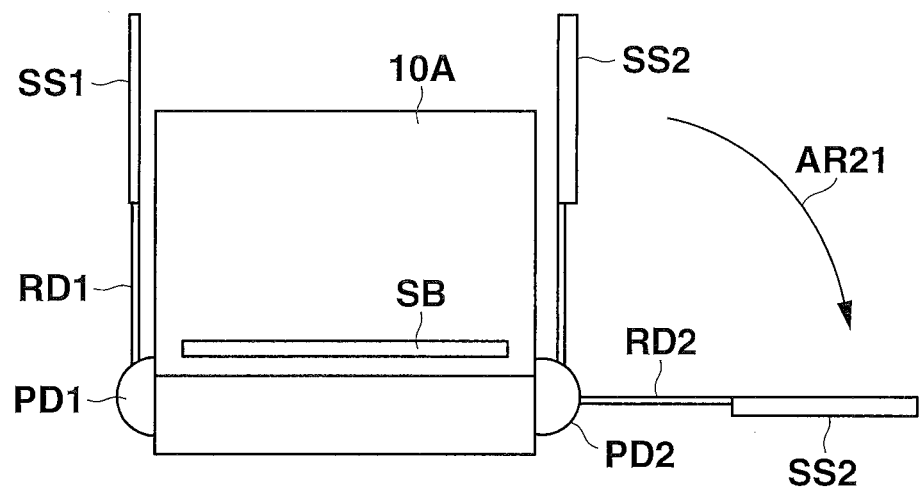
FIG. 2A is a view for describing a folded/unfolded state of a sub-screen in the embodiment, FIG. 2A illustrating the configuration of an apparatus housing 10A, as viewed from above.

FIG. 2A illustrates the configuration of the apparatus housing 10A, as viewed from above. In a folded state in which the sub-screens SS1 and SS1 are not used for projection, the sub-screens SS1 and SS1 are positioned on a rear side of the side surfaces of the apparatus housing 10A. FIG. 2A illustrates a first unfolded state in which the sub-screen SS2 and rod RD2 on the left side (right side in FIG. 2A) of the signage apparatus 10 have been rotated to the front surface side of the apparatus housing 10A by the driving mechanism PD2, as indicated by an arrow AR21.

Figure 2B:
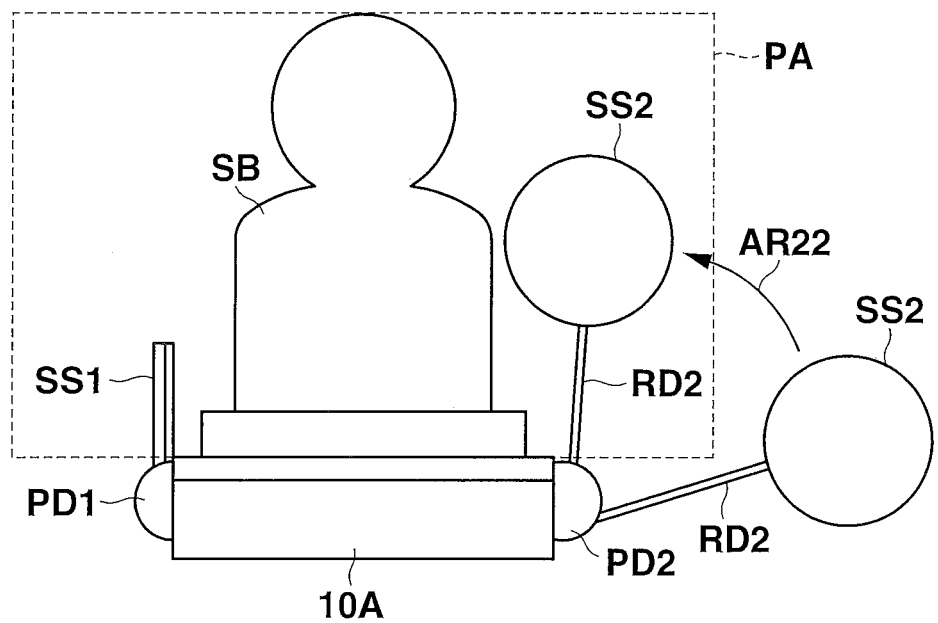
FIG. 2B is a view illustrating the configuration of the apparatus housing 10A, as viewed from the front side thereof.

FIG. 2B illustrates the configuration of the apparatus housing 10A, as viewed from the front side thereof. In FIG. 2B, the sub-screen SS1 is in the folded state. In addition, FIG. 2B illustrates a second unfolded state in which the sub-screen SS2 and rod RD2 have been rotated to a position away from the signage board SB in the projectable area PA by the driving mechanism PD2, as indicated by an arrow AR22.

In this manner, the sub-screen SS1, SS2 can selectively be unfolded and moved to a position away from the signage board SB in the projectable area PA by the driving mechanism PD1, PD2.

Figure 3:
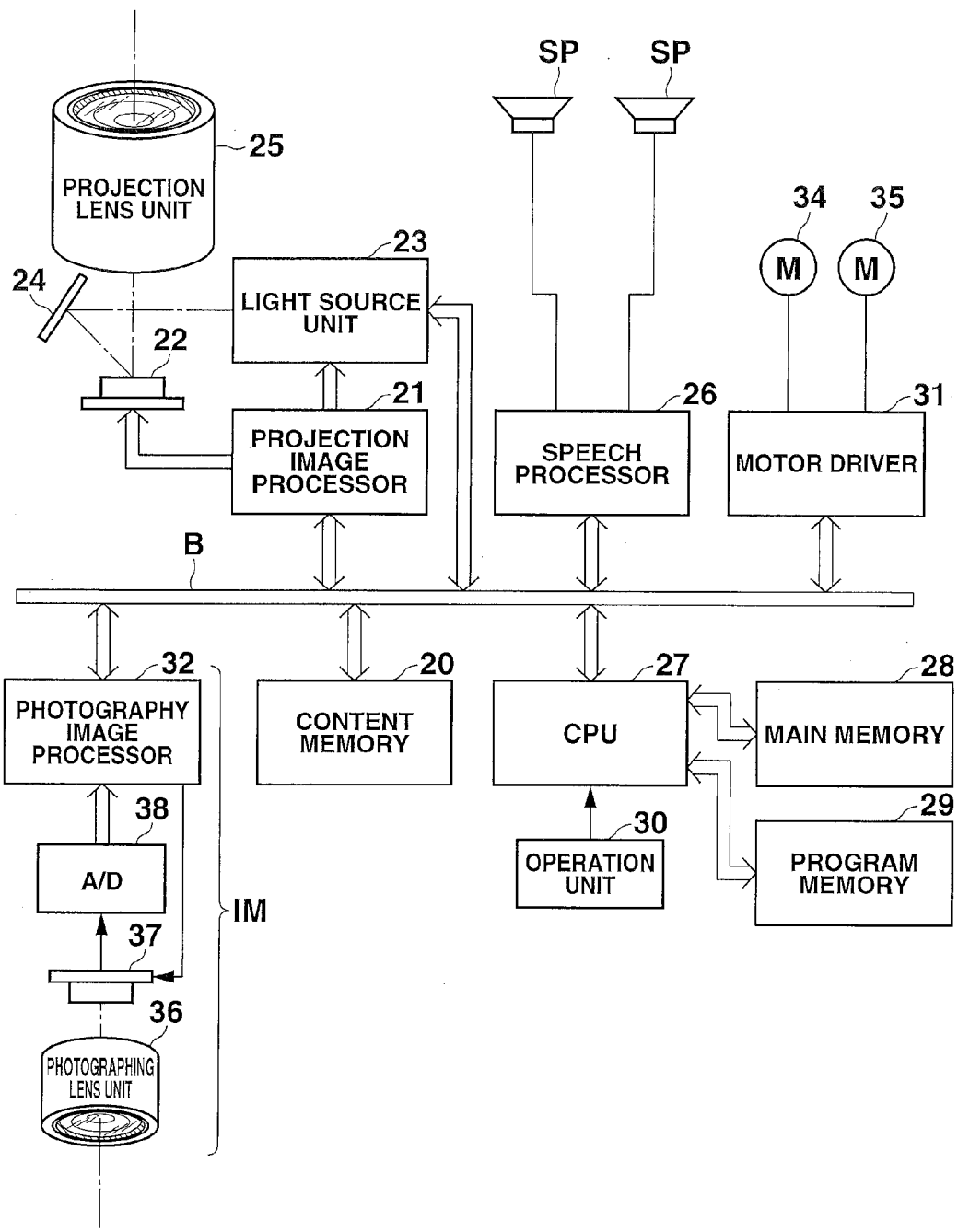
FIG. 3 is a block diagram illustrating a functional configuration of an electronic circuit in the signage apparatus according to the embodiment.

Next, referring to FIG. 3, the functional configuration of, mainly, an electronic circuit of the signage apparatus 10 is described. In FIG. 3, in the signage apparatus 10, image data and speech data are prestored in a content memory 20 as files of content data. The image data, which was read out from the content memory 20, is sent to a projection image processor 21 via a bus B.

The projection image processor 21 drives a micro-mirror element 22 that is a display element, by high-speed time-division driving with multiplication of a frame rate according to a predetermined format, for example, 120 [frames/sec], the number of division of color components, and the number of display gray levels, in accordance with the image data that was sent.

The micro-mirror element 22 executes a display operation by individually ON/OFF operating at high speed the inclination angles of a plurality of micro-mirrors which arranged in an array, thereby forming an optical image by reflective light from the micro-mirrors.

On the other hand, a light source unit 23 cyclically emits primary-color light of R, G and B in a time-division manner. The light source unit 23 includes an LED which is a semiconductor light-emitting element, and repeatedly emits primary-color light of R, G and B in a time-division manner. The LED, which the light source unit 23 includes, is an LED in a broad sense, and may include an LD (semiconductor laser) or an organic EL element.

In addition, use may be made of primary-color light having a wavelength that is different from the wavelength of the original light, this primary-color light being excited by irradiating a phosphor with the light emitted from the LED. The primary-color light from the light source unit 23 is total-reflected by a mirror 24, and is radiated on the micro-mirror element 22.

Then, an optical image is formed by reflective light from the micro-mirror element 22, and the formed optical image is projected on the signage board SB and sub-screen SS1, SS2 in the projectable area PA via a projection lens unit 25.

In addition, the speech data, which was read out from the content memory 20, is sent to a speech processor 26 via the bus B. The speech processor 26 includes a sound source circuit of, for example, a PCM sound source, reproduces an analog audio signal based on the speech data that was sent, and produces sound from the speaker units SP.

A CPU 27 controls the operations of all the above-described circuits. The CPU 27 is directly connected to a main memory 28 and a program memory 29. The main memory 28 is composed of, for example, an SRAM, and functions as a work memory of the CPU 27. The program memory 29 is composed of an electrically rewritable non-volatile memory, such as a flash ROM, and stores operational programs which the CPU 27 executes, and various routine data, etc.

The CPU 27 reads out operational programs, routine data, etc., which are stored in the program memory 29, develops and loads them in the main memory 28, and executes the programs, thereby comprehensively controlling the signage apparatus 10.

The CPU 27 executes various projection operations in accordance with operation signals from the operation unit 30. The operation unit 30 sends to the CPU 27 operation signals corresponding to operations on the operation buttons C1 to C4 provided on the main body of the signage apparatus 10.

The CPU 27 is connected to a motor driver 31 and a photography image processor 32 via the bus B.

The motor driver 31 drives servo motors (M) 34, 35, provided in the driving mechanisms PD1, PD2, and individually unfolds and folds the sub-screens SS1, SS2 by the driving mechanisms PD1, PD2.

The photography image processor 32 scan-drives a solid-state image sensing device, such as a CMOS image sensor 47, which is disposed at an in-focus position of a superwide-angle photographing lens unit 36 which constitutes a part of the imaging unit IM. Thereby, the photography image processor 32 acquires an image signal which is obtained by photographing a wide range including the front side of the signage apparatus 10.

The image signal, which is output from the CMOS image sensor 37, is digitized by an A/D conversion circuit 38, and then sent to the photography image processor 32. The photography image processor 32 sends the acquired image data to the CPU 27.

Next, the operation of the above-described embodiment is described.

Figure 4:
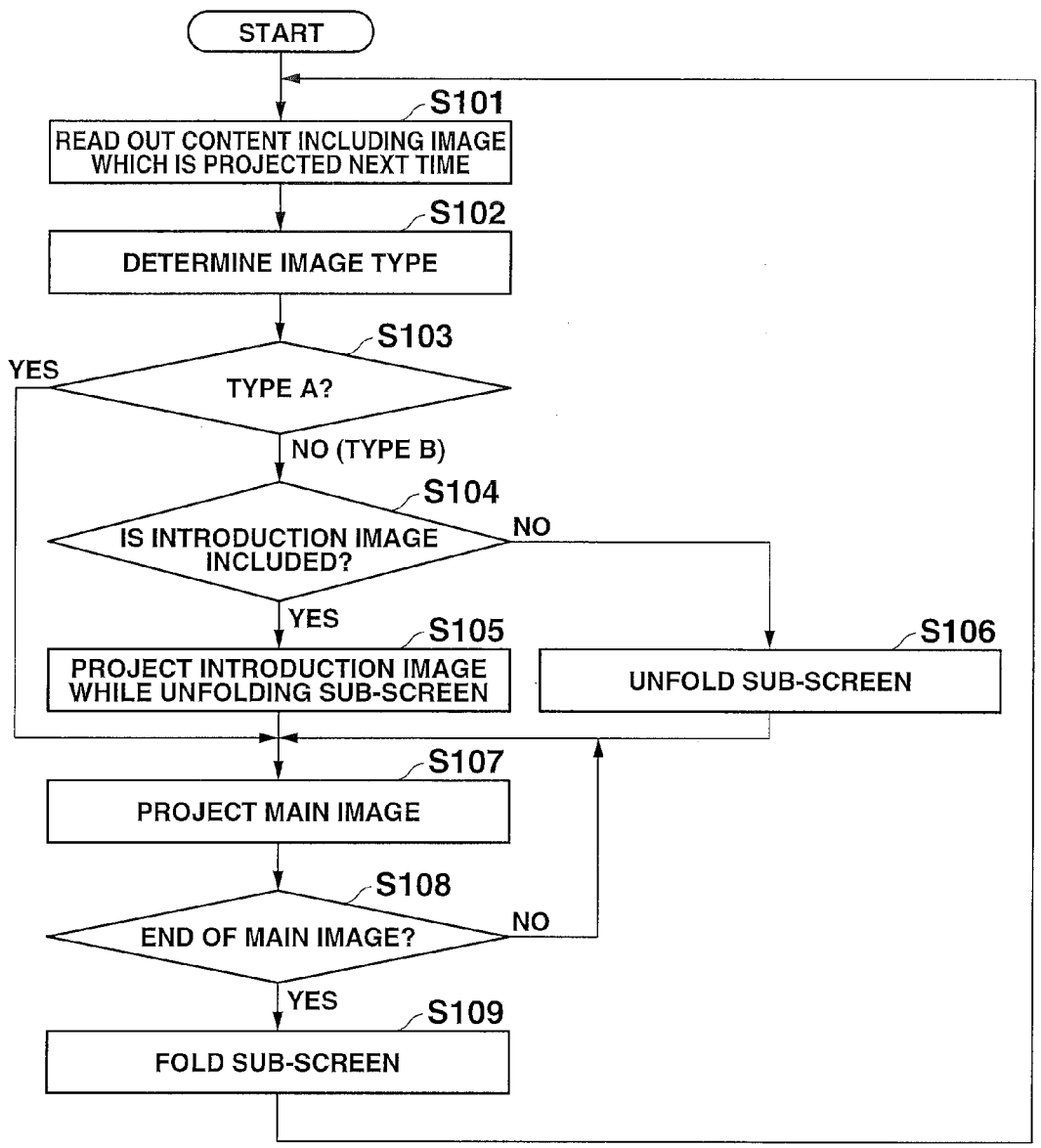
FIG. 4 is a flowchart illustrating a basic process content at a time of projecting an image in the embodiment.

FIG. 4 is a flowchart illustrating a basic process content at a time of projecting an image by the signage apparatus 10. When reproducing content data stored in the content memory 20, the CPU 27 reproduces image data which constitutes the content data. The flowchart of FIG. 4 mainly illustrates, in an extracted manner, the process content relating to the shifting of the sub-screen SS1, SS2, which is executed when the image data is reproduced.

In the meantime, information for distinguishing the image type between "Type A" and "Type B" is added to the image data which constitutes the content data stored in the content memory 20. "Type A" indicates, for example, an image which is projected on only the signage board SB that is a main screen, without the sub-screen SS1, SS2 being required. "Type B" indicates an image which is projected with use of the signage board SB and at least one of the sub-screens SS1 and SS2.

Further, the image data for projection with use of the signage board SB and at least one of the sub-screens SS1 and SS2 includes image data for projecting a preliminary introduction image prior to an image which is a main image. The introduction image is projected from a time point at which the sub-screen SS1, SS2 has entered the projectable area PA in the process of a transition from the first unfolded state to the second unfolded state in which the sub-screen SS1, SS2 is shifted into the projectable area PA (a second screen is shifted in relation to the projection area), as illustrated in FIG. 2B.

In this manner, if the sub-screen SS1, SS2 is within the projectable area PA, an image can be projected on the sub-screen SS1, SS2, even if the sub-screen SS1, SS2 is at a position in an intermediate stage before reaching the second unfolded state. Specifically, the sub-screen SS1, SS2 can be moved in synchronism with the image data to a position corresponding to the projection content. While the sub-screen SS1, SS2 is being moved, the distance between the sub-screen SS1, SS2 and the projection lens 25 is substantially unchanged.

It is assumed that the folded state of the sub-screen SS1, SS2 is the home position of the sub-screen SS1, SS2, and that the sub-screen SS1, SS2 is unfolded and driven so as to be positioned within the projectable area PA each time the image of "Type B" is projected, and the sub-screen SS1, SS2 returns to the original folded state after the end of projection of the image.

At the beginning of the process, the CPU 27 reads out image data, which is projected next time, from the content memory 20 (step S101). The CPU 27 first determines the type information of the image data (S102). Then, the CPU 27 executes an image type determination step of determining whether or not the image data is image data of Type A for projecting an image on only the signage board (first screen) SB, without the sub-screen (second screen) SS1, SS2 being required (step S103).

If it is determined that the image data is not image data of Type A (No in step S103), the image data is image data of Type B. Thus, the CPU 27 further determines whether the image data includes image data for projecting a preliminary introduction image (step S104).

If it is determined that the image data for projecting a preliminary introduction image is included (Yes in step S104), the CPU 27 executes projection of the introduction image in synchronism with the timing of the shifting of the sub-screen SS1, SS2 into the projectable area PA, while unfolding the sub-screen SS1, SS2 by the motor driver 31 with use of the servo motor 34, 35 and the driving mechanism PD1, PD2 (step S105).

If it is determined that no image data for projecting a preliminary introduction image is included (No in step S104), the CPU 27 unfolds the sub-screen SS1, SS2 by the motor driver 31 with use of the servo motor 34, 35 and the driving mechanism PD1, PD2. Specifically, the CPU 27 executes a screen control step of shifting the sub-screen (second screen) SS1, SS2 by a shifting mechanism in accordance with the result of determination in the image type determination step (step S106).

After the process of projecting the introduction image while unfolding the sub-screen SS1, SS2 in step S105, or after the process of unfolding the sub-screen SS1, SS2 in step S106, or after it is determined in step S103 that the image data which was read out from the content memory 20 is image data of Type A (Yes in step S103), the CPU 27 executes a projection operation using image data of the main image (step S107) and, while executing this projection operation, waits for the end of the projection of this image (step S108).

At a time point of determining the end of the projection of the main image (Yes in step S108), the CPU 27, if the sub-screen SS1, SS2 has been unfolded, causes the motor driver 31 to close and fold the sub-screen SS1, SS2 with use of the servo motor 34, 35 and driving mechanism PD1, PD2 (step S109), and returns to step S101 in preparation for projection of the next image.

As has been described above in detail, according to the present embodiment, while the area on which an image can be projected is being effectively utilized, the sub-screen SS1, SS2 is unfolded in relation to the signage board SB, where necessary, with respect to each image that is to be projected. Thus, an image with a high appeal power to a viewer, who may be present around the signage apparatus 10, can be projected.

In the above embodiment, a plurality of sub-screens SS1 and SS2 are provided in association with the signage board SB that is the main screen. Where necessary, the signage board SB and sub-screen SS1, SS2 are properly combined to project an image. Thus, an image with a higher appeal power to the viewer can be provided, depending on how an image to be projected is devised.

Furthermore, in the embodiment, an image, which is synchronized with the timing of unfolding of the sub-screen SS1, SS2 that is shifted into the projectable area PA, is projected as the introduction image prior to the main image. Therefore, a variation can be imparted to the image that is projected, and an image with a higher appeal power to the viewer can be provided.

Incidentally, in the above embodiment, the case was described in which the sub-screen SS1, SS2 is used in combination with the signage board SB, and the introduction image is projected prior to the main image. However, the present invention is not limited to this case. In the process of folding the sub-screen SS1, SS2 after the end of projection of the main image, an ending image using the sub-screen SS1, SS2 may be projected while the sub-screen SS1, SS2 is still within the projectable area PA.

The present invention is not limited to the above-described embodiment. In practice, various modifications may be made without departing from the spirit of the invention. In addition, the functions, which are executed in the above embodiment, may be properly combined and implemented as much as possible. The above-described embodiment includes inventions in various stages, and various inventions can be derived from proper combinations of structural elements disclosed herein. For example, even if some structural elements in all the structural elements disclosed in the embodiment are omitted, if advantageous effects can be obtained, the structure, in which the structural elements are omitted, can be derived as an invention.

What is claimed is:

1. A projection apparatus comprising:
a first screen arranged in a first part of a projection area;
a second screen configured to be moved to a second part of the projection area, the second part being at a different position than the first part;
an actuator configured to move the second screen to the second part of the projection area;
a projector configured to project, at one time, a first image based on image data and a second image based on the image data on to the projection area; and
a screen controller configured to:
determine that the image data includes the first image and the second image to be projected on to the projection area at the one time;
control the actuator to move the second screen to the second part of the projection area; and
control the projector to project, at the one time, the first image on the first screen at the first part of the projection area and the second image on the second screen at the second part of the projection area.

2. The projection apparatus of claim 1,
wherein the first screen is permanently provided at the first part of the projection area, and
wherein the screen controller is configured to control the actuator to move the second screen within the projection area in accordance with the second image of the image data projected by the projector.

3. The projection apparatus of claim 2,
wherein the screen controller is configured to control the actuator to move the second screen in relation to the projection area in synchronism with the second image of the image data projected by the projector.

4. The projection apparatus of claim 1,
wherein the screen controller is configured to control the actuator to move the second screen in relation to the projection area in synchronism with the second image of the image data projected by the projector.

5. A method for controlling an apparatus comprising a first screen arranged in a first part of a projection area; a second screen configured to be moved to a second part of the projection area, the second part being different at a different position than the first part; an actuator configured to move the second screen to the second part of the projection area; and a projector configured to project, at one time, a first image based on image data and a second image based on the image data on to the projection area, the method comprising:
determining that the image data includes the first image and the second image to be projected on to the projection area at the one time;
controlling the actuator to move the second screen to the second part of the projection area; and
controlling the projector to project, at the one time, the first image on the first screen at the first part of the projection area and the second image on the second screen at the second part of the projection area.

6. A non-transitory computer readable storage medium having stored therein instructions, which when executed by a computer included in an apparatus comprising a first screen arranged in a first part of a projection area; a second screen configured to be moved to a second part of the projection area, the second part being at a different position than the first part; an actuator configured to move the second screen to the second part of the projection area; and a projector configured to project, at one time, a first image based on image data and a second image based on the image data on to the projection area, cause the computer to:
determine that the image data includes the first image and the second image to be projected on to the projection area at the one time;
control the actuator to move the second screen to the second part of the projection area; and
control the projector to project, at the one time, the first image on the first screen at the first part of the projection area and the second image on the second screen at the second part of the projection area.

* * * * *